United States Patent
Ruby et al.

(10) Patent No.: US 10,802,664 B2
(45) Date of Patent: Oct. 13, 2020

(54) DYNAMIC LAYOUT DESIGN

(71) Applicant: ADOBE INC., San Jose, CA (US)

(72) Inventors: William Thomas Ruby, San Francisco, CA (US); Michael Spencer Cragg, Berkeley, CA (US); Danielle Takara Morimoto, San Francisco, CA (US)

(73) Assignee: Adobe Inc., San Jose, CA (US)

(*) Notice: Subject to any disclaimer, the term of this patent is extended or adjusted under 35 U.S.C. 154(b) by 378 days.

(21) Appl. No.: 15/447,031

(22) Filed: Mar. 1, 2017

(65) Prior Publication Data
US 2018/0253211 A1    Sep. 6, 2018

(51) Int. Cl.
G06F 17/00 (2019.01)
G06F 3/0481 (2013.01)
G06F 3/0484 (2013.01)
G06F 8/38 (2018.01)
G06F 8/34 (2018.01)

(52) U.S. Cl.
CPC ...... G06F 3/04812 (2013.01); G06F 3/04845 (2013.01); G06F 8/34 (2013.01); G06F 8/38 (2013.01)

(58) Field of Classification Search
CPC . G06F 17/212; G06F 8/34; G06F 8/38; G06F 3/04845; G06F 3/04812
See application file for complete search history.

(56) References Cited

U.S. PATENT DOCUMENTS

| | | | |
|---|---|---|---|
| 5,895,476 A * | 4/1999 | Orr | G06F 40/12 715/202 |
| 5,895,477 A * | 4/1999 | Orr | G06F 40/14 715/202 |
| 5,903,902 A * | 5/1999 | Orr | G06F 40/174 715/202 |
| 5,956,737 A * | 9/1999 | King | G06F 40/174 715/202 |
| 2004/0003350 A1* | 1/2004 | Simmons | G06F 40/166 715/244 |
| 2007/0162848 A1* | 7/2007 | Mansfield | G06F 40/186 715/234 |
| 2011/0225525 A1* | 9/2011 | Chasman | G06F 3/0486 715/763 |
| 2013/0117653 A1* | 5/2013 | Sukhanov | G06F 3/04847 715/227 |
| 2015/0007071 A1* | 1/2015 | Gilbert | G06F 30/00 715/765 |

* cited by examiner

*Primary Examiner* — Mohammed H Zuberi
(74) *Attorney, Agent, or Firm* — Shook, Hardy & Bacon L.L.P.

(57) ABSTRACT

Embodiments of the present invention provide systems, methods, and computer storage media for facilitating layout designs. In embodiments, an input event is detected indicating a desire to include a new object within a layout design including a first component. Thereafter, it is determined that the first component within the layout is to be modified to accommodate a second component containing the new object. The layout design is automatically modified to include the first component and the second component in the layout design.

20 Claims, 12 Drawing Sheets

DYNAMIC LAYOUT DESIGN

BACKGROUND

Users oftentimes create layouts in an effort to arrange various visual elements in electronic documents. For example, a user might desire to create a layout when electronically designing a pamphlet, a brochure, a poster, a card, a mobile application, a web page, or another electronic document. To do so, the user may position various visual elements, such as images and text, within an electronic document such that a visually pleasing design is created.

Generating a desired layout, however, can be time consuming and tedious. In this regard, an unconstrained layout design can enable a user to manipulate a layout, but requires the user to align the content as well as manage relationships between various elements to obtain a desired result. In this regard, when a user desires to enlarge one visual element (e.g., an image) and reduce another visual element (e.g., text) within an electronic document, the user may manipulate the first visual element to expand the first visual element as desired and, thereafter, manipulate the second visual element to reduce the size of the second visual element as desired. Further, the user might individually manipulate borders of both visual elements to align the elements with one another (or other elements).

SUMMARY

Embodiments of the present invention relate to facilitating dynamic layout design based on input provided by a user. In this way, a user can provide input to effectuate a coordinated layout design. In one embodiment, an input event is detected indicating a desire to include a new object within a layout design including a first component. Thereafter, it is determined that the first component within the layout is to be modified to accommodate a second component containing the new object. The layout design is automatically modified to include the first component and the second component in the layout design.

BRIEF DESCRIPTION OF THE DRAWINGS

The present invention is described in detail below with reference to the attached drawing figures, wherein.

DETAILED DESCRIPTION

Overview

Figure 1:
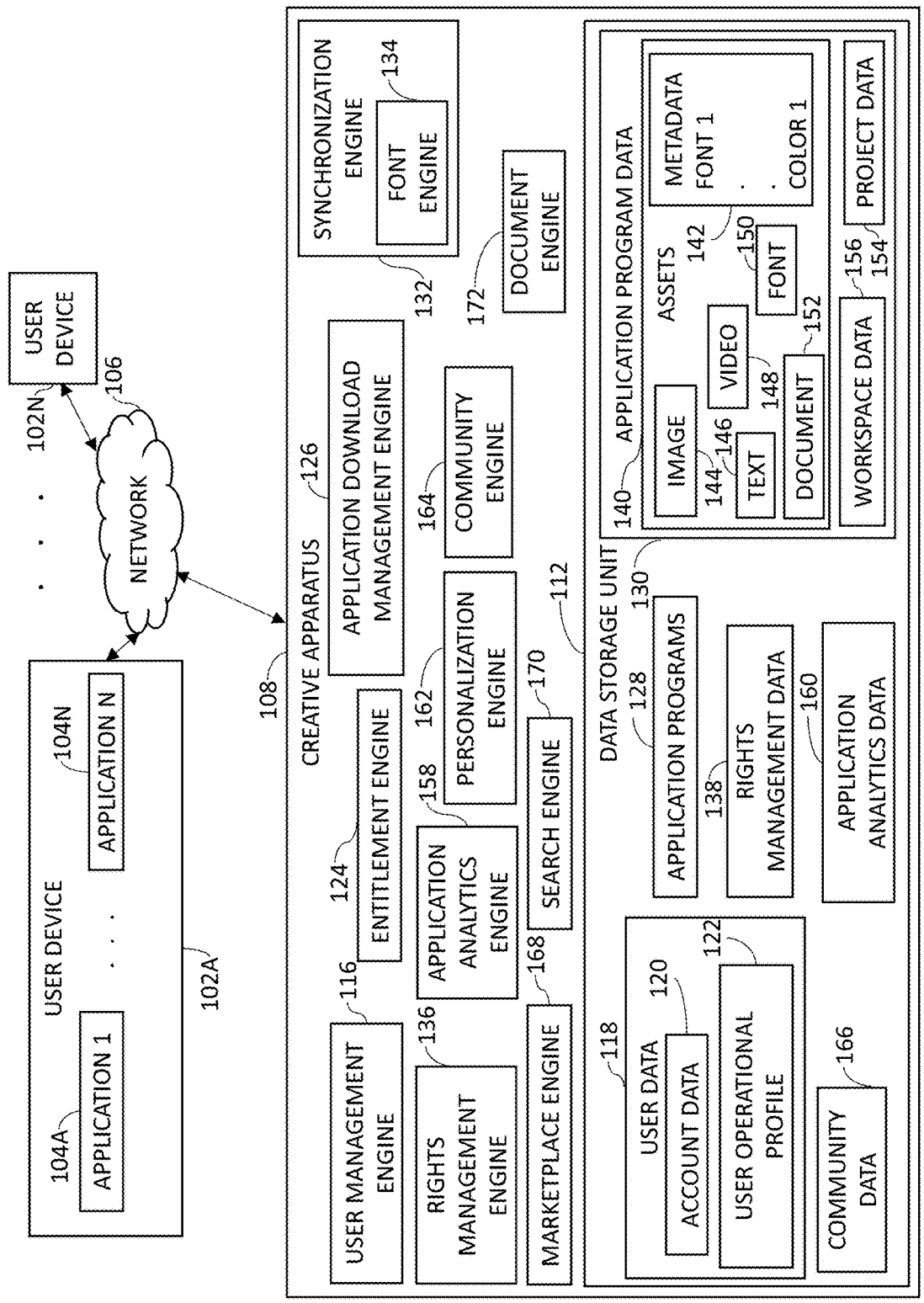
FIG. 1 is a block diagram of an exemplary computing system architecture in which embodiments of the invention may be employed.

Oftentimes, a user (e.g., a designer) might desire to generate an electronic document, such as a mobile application page, a web page, a poster, a card, a pamphlet, a program, etc. using various visual elements. Accordingly, a user might select visual elements, such as images or a text box, and place the various visual elements onto an electronic document, or canvas. To generate a desired visual presentation of elements, the user may arrange the visual elements in different positions, resize the visual elements, and/or the like.

To assist in developing a layout, some tools have been developed that provide layout editing. Such tools enable a user to edit aspects of a layout. Generally, with conventional layout editing tools, however, a user manually positions or aligns elements within a document. For example, to add a new image to a canvas, a user may select the image, place the image on the canvas, as well as position and size the image as desired. Based on the new image position and size, the user may also modify other existing elements, such as images, on the canvas. For instance, the user may resize, reposition, and/or realign another existing image to accommodate the newly added image. While some existing layout editing tools enable a user to modify a size of an element within a predefined template, the predefined template oftentimes is not modifiable as desired by a user, for example, as a user cannot add another design element (e.g., image) to the layout or reposition various design elements to another location within the layout.

Accordingly, embodiments of the present invention are directed to facilitating coordinated, dynamic layout design based on input provided by a user. In this way, a user can provide input to effectuate a desired layout that is created in a coordinated manner. In particular, as a user provides input with respect to a layout component, related components associated therewith can be identified and automatically modified in accordance with the user input. As such, based on the user input, the layout arrangement is reconfigured to accommodate a particular modification made to a component of the layout. A layout generally refers to an arrangement of one or more components. A layout component, or component, refers to a cell, container, or shape, such as a box, in which an object(s) can be placed. An object can be any type of visual object or element. Although an object is generally described herein in relation to an image, as can be appreciated, an object can be any type of data, such as text, a video, a combination thereof, or the like.

In implementation, a layout component can include one or more components structured therein such that the components are nested within one another in a layout. Nesting components enables relationships between components to be generated so that a layout can be efficiently and harmoniously designed. In this regard, when a modification is made in association with one aspect of a component (e.g., size), related components can be adjusted to accommodate for the component modification.

In accordance with embodiments described herein, dynamic layout design may include component generation and/or component manipulation. Component generation refers to generation of a new component within a layout structure. In this regard, a user may indicate to place a new object into a layout. In such a case, based on a location at which to generate a component within the layout, one or more related components can be identified and adjusted to accommodate a new component in which the new object (e.g., image) can be positioned. By way of example, and with brief reference to FIG. 3B, assume a user selects an image object 304B and moves the image object 304B over a portion of component 302B. In such a case, the component 302B can be identified as a related component and adjusted to accommodate or fit a new component within the layout.

Component manipulation refers to manipulation of a component within a layout structure. In this regard, a user may indicate to manipulate a component within a layout. For example, a user may select to move a border of a component or replace an object within a component. In such a case, the component can be manipulated or modified based on the input provided by the user. By way of example, and with brief reference to FIG. 3J-3K, assume a user selects to move a border or edge 340J of FIG. 3J. In such a case, as illustrated in FIG. 3K, a component corresponding with image A is decreased in size, while components associated with images E, D, F, and C are increased in size.

Automatically reconfiguring a layout design in a coordinated manner based on a user interaction enables a user to more efficiently and more precisely generate a desired layout. In particular, a user input associated with one component can result in automatic manipulation of another related component(s) such that the layout design accounts for modifications to the component. Further, a user can add objects to a layout to dynamically modify a design layout.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Example Operating Environment

FIG. 1 is a diagram of an environment 100 in which one or more embodiments of the present disclosure can be practiced. The environment 100 includes one or more user devices, such as a user devices 102A-102N. Examples of the user devices include, but are not limited to, a personal computer (PC), tablet computer, a desktop computer, a processing unit, any combination of these devices, or any other suitable device having one or more processors. Each user device includes at least one application supported by the creative apparatus 108. It is to be appreciated that the following description may generally refer to the user device 102A as an example and any other user device can be used.

A user of the user device can utilize various products, applications, or services supported by the creative apparatus 108 via the network 106. The user devices 102A-102N can be operated by various users. Examples of the users include, but are not limited to, creative professionals or hobbyists who use creative tools to generate, edit, track, or manage creative content, advertisers, publishers, developers, content owners, content managers, content creators, content viewers, content consumers, designers, editors, any combination of these users, or any other user who uses digital tools to create, edit, track, or manages digital experiences.

A digital tool, as described herein, includes a tool that is used for performing a function or a workflow electronically. Examples of a digital tool include, but are not limited to, content creation tool, content editing tool, content publishing tool, content tracking tool, content managing tool, content printing tool, content consumption tool, any combination of these tools, or any other tool that can be used for creating, editing, managing, generating, tracking, consuming or performing any other function or workflow related to content. A digital tool includes the creative apparatus 108.

Digital experience, as described herein, includes experience that can be consumed through an electronic device. Examples of the digital experience include content creating, content editing, content tracking, content publishing, content posting, content printing, content managing, content viewing, content consuming, any combination of these experiences, or any other workflow or function that can be performed related to content.

Content, as described herein, includes electronic content. Examples of the content include, but are not limited to, image, video, website, webpage, user interface, menu item, tool menu, magazine, slideshow, animation, social post, comment, blog, data feed, audio, advertisement, vector graphic, bitmap, document, any combination of one or more content, or any other electronic content.

User devices 102A-102N can be connected to a creative apparatus 108 via a network 106. Examples of the network 106 include, but are not limited to, internet, local area network (LAN), wireless area network, wired area network, wide area network, and the like.

The creative apparatus 108 includes one or more engines for providing one or more digital experiences to the user. The creative apparatus 108 can be implemented using one or more servers, one or more platforms with corresponding application programming interfaces, cloud infrastructure and the like. In addition, each engine can also be implemented using one or more servers, one or more platforms with corresponding application programming interfaces, cloud infrastructure and the like. The creative apparatus 108 also includes a data storage unit 112. The data storage unit 112 can be implemented as one or more databases or one or more data servers. The data storage unit 112 includes data that is used by the engines of the creative apparatus 108.

A user of the user device 102A visits a webpage or an application store to explore applications supported by the creative apparatus 108. The creative apparatus 108 provides the applications as a software as a service (SaaS), or as a standalone application that can be installed on the user device 102A, or as a combination. The user can create an account with the creative apparatus 108 by providing user details and also by creating login details. Alternatively, the creative apparatus 108 can automatically create login details for the user in response to receipt of the user details. In some embodiments, the user is also prompted to install an application manager. The application manager enables the user to manage installation of various applications supported by the creative apparatus 108 and also to manage other functionalities, such as updates, subscription account and the like, associated with the applications. The user details are received by a user management engine 116 and stored as user data 118 in the data storage unit 112. In some embodiments, the user data 118 further includes account data 120 under which the user details are stored.

The user can either opt for a trial account or can make payment based on type of account or subscription chosen by the user. Alternatively, the payment can be based on product or number of products chosen by the user. Based on payment details of the user, a user operational profile 122 is generated by an entitlement engine 124. The user operational profile 122 is stored in the data storage unit 112 and indicates entitlement of the user to various products or services. The user operational profile 122 also indicates type of user, e.g., free, trial, student, discounted, or paid.

In some embodiment, the user management engine 116 and the entitlement engine 124 can be one single engine performing the functionalities of both the engines.

The user can then install various applications supported by the creative apparatus 108 via an application download management engine 126. Application installers or application programs 128 present in the data storage unit 112 are fetched by the application download management engine 126 and made available to the user directly or via the application manager. In one embodiment, an indication of all application programs 128 are fetched and provided to the user via an interface of the application manager. In another embodiment, an indication of application programs 128 for which the user is eligible based on user's operational profile are displayed to the user. The user then selects the application programs 128 or the applications that the user wants to download. The application programs 128 are then downloaded on the user device 102A by the application manager via the application download management engine 126. Corresponding data regarding the download is also updated in the user operational profile 122. An application program 128 is an example of the digital tool. The application download management engine 126 also manages the process of providing updates to the user device 102A.

Upon download, installation and launching of an application program, in one embodiment, the user is asked to provide the login details. A check is again made by the user management engine 116 and the entitlement engine 124 to ensure that the user is entitled to use the application program. In another embodiment, direct access is provided to the application program as the user is already logged into the application manager.

The user uses one or more application programs 104A-104N installed on the user device to create one or more projects or assets. In addition, the user also has a workspace within each application program. The workspace, as described herein, includes setting of the application program, setting of tools or setting of user interface provided by the application program, and any other setting or properties specific to the application program. Each user can have a workspace. The workspace, the projects, and/or the assets can be stored as application program data 130 in the data storage unit 112 by a synchronization engine 132. Alternatively or additionally, such data can be stored at the user device, such as user device 102A.

The application program data 130 includes one or more assets 140. The assets 140 can be a shared asset which the user wants to share with other users or which the user wants to offer on a marketplace. The assets 140 can also be shared across multiple application programs 128. Each asset includes metadata 142. Examples of the metadata 142 include, but are not limited to, font, color, size, shape, coordinate, a combination of any of these, and the like. In addition, in one embodiment, each asset also includes a file. Examples of the file include, but are not limited to, an image 144, text 146, a video 148, a font 150, a document 152, a combination of any of these, and the like. In another embodiment, an asset only includes the metadata 142.

The application program data 130 also include project data 154 and workspace data 156. In one embodiment, the project data 154 includes the assets 140. In another embodiment, the assets 140 are standalone assets. Similarly, the workspace data 156 can be part of the project data 154 in one embodiment while it may be standalone data in other embodiments.

A user can operate one or more user devices to access data. In this regard, the application program data 130 is accessible by a user from any device, including a device which was not used to create the assets 140. This is achieved by the synchronization engine 132 that stores the application program data 130 in the data storage unit 112 and enables the application program data 130 to be available for access by the user or other users via any device. Before accessing the application program data 130 by the user from any other device or by any other user, the user or the other user may need to provide login details for authentication if not already logged in. In some cases, if the user or the other user is logged in, then a newly created asset or updates to the application program data 130 are provided in real time. The rights management engine 136 is also called to determine whether the newly created asset or the updates can be provided to the other user or not. The workspace data 156 enables the synchronization engine 132 to provide a same workspace configuration to the user on any other device or to the other user based on the rights management data 138.

In various embodiments, various types of synchronization can be achieved. For example, the user can pick a font or a color from the user device 102A using a first application program and can use the font or the color in a second application program on any other device. If the user shares the font or the color with other users, then the other users can also use the font or the color. Such synchronization generally happens in real time. Similarly, synchronization of any type of the application program data 130 can be performed.

In some embodiments, user interaction with the applications 104 is tracked by an application analytics engine 158 and stored as application analytics data 160. The application analytics data 160 includes, for example, usage of a tool, usage of a feature, usage of a workflow, usage of the assets 140, and the like. The application analytics data 160 can include the usage data on a per user basis and can also include the usage data on a per tool basis or per feature basis or per workflow basis or any other basis. The application analytics engine 158 embeds a piece of code in the applications 104 that enables the application to collect the usage data and send it to the application analytics engine 158. The application analytics engine 158 stores the usage data as the application analytics data 160 and processes the application analytics data 160 to draw meaningful output. For example, the application analytics engine 158 can draw an output that the user uses "Tool 4" maximum number of times. The output of the application analytics engine 158 is used by a personalization engine 162 to personalize tool menu for the user to show "Tool 4" on top. Other types of personalization can also be performed based on the application analytics data 158. In addition, the personalization engine 162 can also use the workspace data 156 or the user data 118 including user preferences to personalize one or more application programs 128 for the user.

In some embodiments, the application analytics data 160 includes data indicating status of project of the user. For example, if the user was preparing an article in a digital publishing application and what was left was publishing the prepared article at the time the user quit the digital publishing application then the application analytics engine 158 tracks the state. Now when the user next opens the digital publishing application on another device then the user is indicated the state and options are provided to the user for publishing using the digital publishing application or any other application. In addition, while preparing the article, a recommendation can also be made by the synchronization engine 132 to incorporate some of other assets saved by the user and relevant for the article. Such a recommendation can be generated using one or more engines, as described herein.

The creative apparatus 108 also includes a community engine 164 which enables creation of various communities and collaboration among the communities. A community, as described herein, includes a group of users that share at least one common interest. The community can be closed, i.e., limited to a number of users or can be open, i.e., anyone can participate. The community enables the users to share each other's work and comment or like each other's work. The work includes the application program data 140. The community engine 164 stores any data corresponding to the community, such as work shared on the community and comments or likes received for the work as community data 166. The community data 166 also includes notification data and is used for notifying other users by the community engine in case of any activity related to the work or new work being shared. The community engine 164 works in conjunction with the synchronization engine 132 to provide collaborative workflows to the user. For example, the user can create an image and can request for some expert opinion or expert editing. An expert user can then either edit the image as per the user liking or can provide expert opinion. The editing and providing of the expert opinion by the expert is enabled using the community engine 164 and the synchronization engine 132. In collaborative workflows, a plurality of users are assigned different tasks related to the work.

The creative apparatus 108 also includes a marketplace engine 168 for providing marketplace to one or more users. The marketplace engine 168 enables the user to offer an asset for selling or using. The marketplace engine 168 has access to the assets 140 that the user wants to offer on the marketplace. The creative apparatus 108 also includes a search engine 170 to enable searching of the assets 140 in the marketplace. The search engine 170 is also a part of one or more application programs 128 to enable the user to perform search for the assets 140 or any other type of the application program data 130. The search engine 170 can perform a search for an asset using the metadata 142 or the file.

The creative apparatus 108 also includes a document engine 172 for providing various document related workflows, including electronic or digital signature workflows, to the user. The document engine 172 can store documents as the assets 140 in the data storage unit 112 or can maintain a separate document repository (not shown in FIG. 1).

Figure 2:
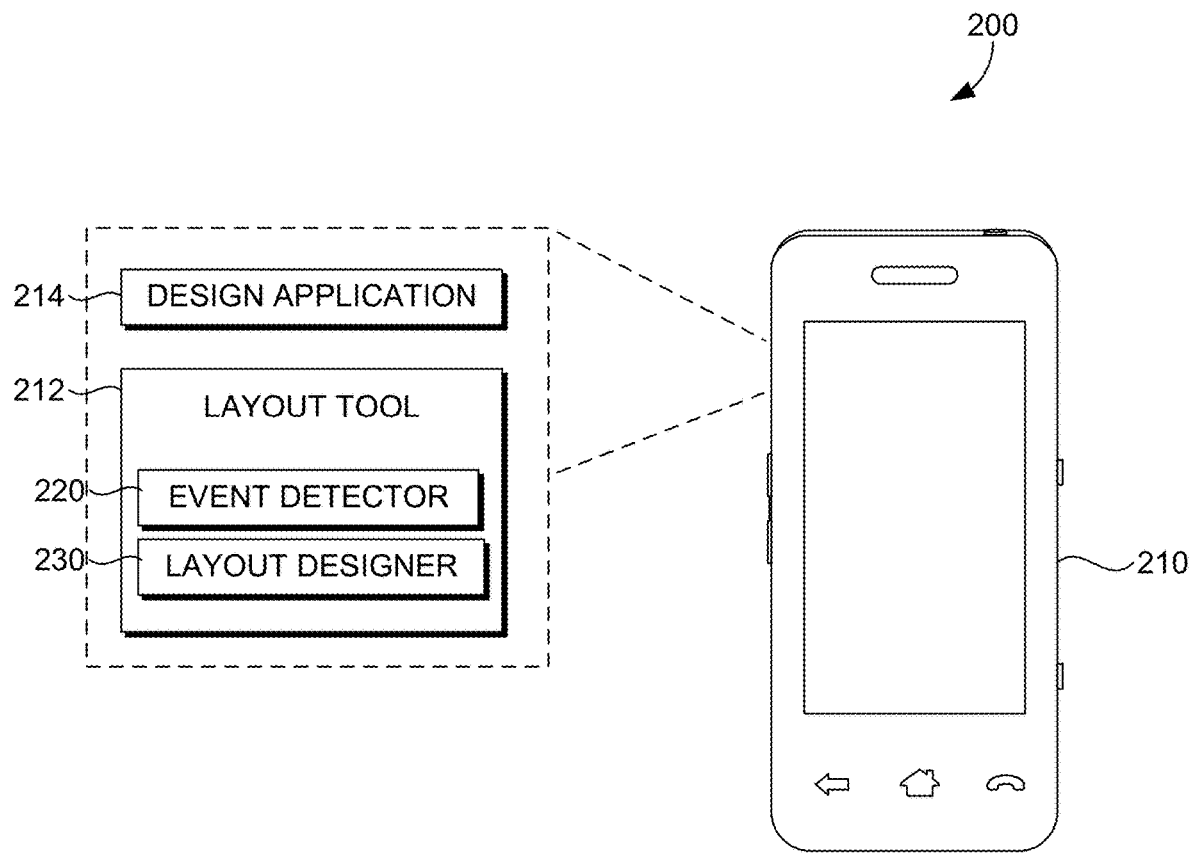
FIG. 2 is a block diagram of an exemplary computing device having a layout design tool, in accordance with embodiments of the present invention.

In accordance with embodiments of the present invention, application programs 128 can include a digital design application that includes a layout tool, as further described in FIG. 2. The digital design application can be provided to the user device 102 as application 104 such that the digital design application operates via the user device. In another embodiment, a layout tool can be provided as an add-on or plug-in to a digital design application.

It is to be appreciated that the engines and working of the engines are described as examples herein, and the engines can be used for performing any step in providing digital experience to the user.

Exemplary Dynamic Layout Design Environment

Referring now to FIG. 2, a block diagram of an exemplary environment 200 suitable for use in implementing embodiments of the invention is shown. Generally, the environment 200 is suitable for, among other things, facilitating coordinated dynamic layout designs based on user input. The environment 200 includes a user device 210. The user device 210 can be any kind of computing device capable of facilitating dynamic layout design. For example, in an embodiment, the user device 210 can be a computing device such as computing device 700, as described below with reference to FIG. 7. In embodiments, the user device 210 can be a personal computer (PC), a laptop computer, a workstation, a mobile computing device, a PDA, a cell phone, or the like.

As illustrated, the user device 210 includes a layout tool 212. The layout tool 212 may be incorporated, or integrated, into an application or an add-on, or plug-in, to an application, such as digital design application 214. The design application 214 may generally be any application capable of facilitating digital design, such as mobile application design, web design, document design, etc. In some implementations, the application(s) comprises a web application, which can run in a web browser, and could be hosted at least partially server-side. In addition, or instead, the design application 214 can comprise a dedicated application, a standalone application, a mobile application, or the like. Although generally discussed herein as the layout tool 212 being associated with an application, in some cases, the layout tool 212, or portion thereof, can be integrated into the operating system (e.g., as a service).

The layout tool 212 is generally configured to facilitate dynamic layout design. In this regard, layouts are dynamically designed in a coordinated manner based on user input. As described, a layout generally refers to a manner in which components are arranged or positioned. A component may be any shape, typically rectangular in shape, in which an object(s), such as an image or text, can be placed. Accordingly, and at a high level, based on user input indicating a desired placement of a new object or a modification to an existing object, components within the layout can automatically adjusted to accommodate the placement or positioning of the new or existing object, or component associated therewith. As such, a user can efficiently generate a desired and coordinated layout of various objects.

In embodiments, layout design, via layout tool 212, may be initiated and/or presented via design application 214 operating on the user device 210. Layout tool 212 might be initiated in any number of ways. In one example, a layout tool might be initiated by selecting a new canvas or background on which to generate a layout. As another example, a layout tool may be initiated in accordance with opening or launching an application, such as design application 214, or opening or launching an existing layout (e.g., previously designed by a user).

As shown in FIG. 2, the layout tool 212 can include an event detector 220 and a layout designer 230. It should be understood that this and other arrangements described herein are set forth only as examples. Other arrangements and elements (e.g., machines, interfaces, functions, orders, groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory. Further, although the layout tool 212 is illustrated in connection with the user device 210, as can be appreciated, functionality described herein may be additionally or alternatively carried out remotely, for example, via a server or other component in connection with the user device 210.

In operation, a user may provide input in an effort to design a layout. User input can be provided in any manner, including utilization of touch input, selector input (e.g., via a mouse), keyboard input, etc. As one example of user input, a user may select an object and move the object within the layout region to design the layout. In this regard, an object may be selected from an object region and moved within a layout region. An object region refers to a region or area in which objects are positioned prior to being placed in a layout. As can be appreciated, any number of objects may be positioned in an object region for selection to adding content to a layout design. Objects in an object region may be added to the object region in any number of ways. For example, an object may be default object, such as a text box or an image provided by the design application 214. As another example, an object may be selected or uploaded by a user such that the object is provided in the object region as possible content for the layout design. A layout region refers to a region or area in which a layout is positioned or placed.

In addition to or in the alternative to placing a new object within a layout, as another example of user input, a user may select a border or boundary of a component within a layout region to manipulate a border(s) of a component thereby designing the layout. Manipulating a component border may occur in any number of ways, such as, for example, selecting a border or edge of a component and moving a selector to move the component border.

In accordance with user input, the event detector 220 is configured to detect input events. As such, the event detector 220 detects user interaction with components in a layout. Input events generally refer to input or interaction provided by a user in association with a layout. Various input events that may be detected include, for example, selection, focus, or hovering of a component within a layout; selection, focus, or hovering of a component region within a layout; selection, focus, or hovering of a component boundary within a layout; or the like. Such input events provide indications of a desired layout manipulation, such as, for example, creating a new component, modifying an existing component, etc.

As such, to detect input events, the event detector 220 may detect an action and/or a position associated with a user interaction. An action refers to an action or command, such as a selection input (e.g., depress a mouse button, press an "enter," etc.), a hover input (e.g., hover a selector, hover an object, etc.), or the like associated with a user interaction. A position refers to a position of a user interaction. Position may be detected using position data associated with a user input. Position data refers to any data that indicates or describes a position of user input, such as a touch position, selected position, or hover position, provided by a user. In this regard, position data refers to an indication of a position, location, or area of a user input. Accordingly, position data might indicate a pixel(s) contacted, an x and/or y coordinate associated with a point(s) of user input (e.g., an x and/or y coordinate of a pixel that corresponds with a contacted area, selected area, or hovered area), or the like.

In embodiments, position data might be raw data generated by one or more touch sensors. In such embodiments, the event detector 220 might receive, retrieve, or access signals from one or more touch sensors of user device 210 indicating touch. Alternatively or additionally, position data may be derived, calculated, identified, or determined, for example, based on raw data generated by touch sensors. That is, signals generated from touch sensors may be processed to identify position data. By way of example only, signals received by the event detector 220 can be processed to determine x and/or y coordinates identifying locations that correspond with an area of a touchscreen display contacted by an object. Any algorithm and/or lookup technique can be utilized to normalize, determine, calculate, identify, and/or derive various types of position data.

Based on an action and/or position associated with user input, the event detector 220 can detect various input events, such as a selected component, a selected component portion (e.g., component region or component boundary), and/or the like. In this regard, the event detector 220 may detect a component, and/or portion thereof, corresponding with a user input. That is, the event detector 220 may detect with which component and/or a particular component portion an input is associated.

In one implementation, to detect a particular component or component portion associated with user input, or being interacted with, the event detector 220 may determine whether an input aligns, matches, or corresponds with one of a particular component, and/or a component portion. In this regard, the event detector 220 may compare the position data to a current or existing layout structure, including component and component portions associated therewith. Based on the alignment of the position data with a component or component portion within a layout, and in some cases a corresponding action (e.g., selection, hovering, etc.), an input event can be detected. As can be appreciated, various methods can be employed to determine an input event based on the position data and/or action data, and examples provided herein are not intended to limit the scope of embodiments of the present invention.

Input events can be detected in association with user interactions with any number of different component portions to design a desired layout. In embodiments described herein, component portions that may be interacted with include, for example, component regions and component boundaries. A component region refers to a region or area of a component. A component region can be defined in any manner in accordance with embodiments of the present invention. A component region may be, for example, an upper region, a left region, a right region, a lower region, a center region, or the like. As previously described, a component can take on any shape, such as, for example, a rectangle or the like. In some cases, a component region is defined based on proximity to an edge or boundary of a component. A component boundary or border refers to a border or edge of a component. By way of example only, in a case that a component exists in the shape of a rectangle, component borders may be the four edges forming the rectangle.

In some cases, component portions may be visually delineated. For instance, a portion or set of portions of a component may be outlined, shaded, or otherwise delineated such that a user can view the various portions. By way of example only, each of a top region, bottom region, left region, right region, and center region of a component may be outlined (e.g., via lines overlaying an object within the component) such that a user can view the various regions with which the user can interact.

The layout designer 230 is configured to facilitate coordinated layout design based on detected user input. To this end, based on a detected input event, the layout designer 230 can determine a design modification or configuration that accommodates a component(s) arrangement desired by the user. Stated differently, the layout generator 230 utilizes input data to determine a manner in which to manipulate a layout or to apply a layout manipulation.

In various embodiments, the layout designer 230 can use the detected input event to determine one or more manipulations to apply to the layout. To this end, in some implementations, an input event may be associated with a layout manipulation(s). A layout manipulation refers to a manner in which to manipulate or modify a layout design. Accordingly, one input event may be associated with and result in a first manipulation(s) or modification(s) of a layout, while another input event may be associated with and result in a second manipulation(s) or modification(s) of a layout. Layout manipulations may correspond with a component formation (a formation(s) to create a new component in a layout) or a component stylization (a modification of a component in a layout). As such, in one embodiment, one set of input events might correspond with a component formation to design a layout, and another set of input events might correspond with a component stylization to design a layout. A component formation refers to the formation, generation, or creation of a new component in a layout. In some cases, component formation occurs to hold or contain an object. In other cases, component formation occurs to attain blank space on the canvas. A component stylization refers to a modification of a component style, such as size, border, shape, content, object, color, etc.

As can be appreciated, any type or number of input events might be used to designate a particular type of layout manipulation. By way of example only, various input events that trigger a component formation may include hovering an object (e.g., an image) over a component region along an edge of a component (e.g., a top component region, a bottom component region, a left-side component region, or a right-side component region), hovering an object over a boundary between components (e.g., a border between a first component and a second component). By way of further example, various input events that trigger a component stylization may include hovering an object over a center region of a component (e.g., to replace an object, or content, associated with a component), selection and/or movement of a component boundary, or the like. Various examples of input events are provided herein, but are not intended to limit the scope of embodiments of the present invention.

In accordance with the input event detected, the layout designer 230 can identify manipulations or modifications to apply to the layout to modify the layout design based on the user input. As such, based on user input indicating to create a new object (component formation), one or more layout manipulations can be identified. Based on user input indicating to modify an existing object within a layout, one or more layout manipulations can be identified.

To manipulate the layout components in a coordinated manner, the layout designer 230 can identify one or more related components to modify or adjust to effectuate a coordinated layout design. A related component refers to a component that is to be manipulated based on a detected input event. In other words, when an input event is detected, components within the layout that are to be impacted can be identified. As can be appreciated, based on the dynamic nature of designing the template, related components may dynamically change. As such, in embodiments, related components can be identified in real time to accommodate the dynamic design of the layout.

Components to modify and manipulations to apply to such components to design the layout in accordance with user inputs can be identified or determined in any number of ways. Various examples are provided herein, but are not intended to limit the scope of embodiments described herein.

In some implementations, in cases that a component formation is to be applied, that is, a new component is to be formed or generated, an existing component(s) related to such a formation can be identified. The related component(s) may be identified based on the detected input event. For example, if the input event is associated with a region (e.g., along a border) of a component existing on the layout, the existing component can be identified as a related component for manipulation. Further, one or more components positioned in an encompassing component (or parent component) may also be identified as related for manipulation. In this way, a related component may be one or more components nested within an encompassing component. An encompassing component, or parent component, refers to a component that contains another component (nested component). An encompassing component can include any number of nested components. Additionally, each of the nested components may be considered encompassing components to the extent such a component nests or contains another component(s). As such, any number of levels of nesting components may exist.

Further, as can be appreciated, a hierarchical structure may be generated and modified as new components are added to a layout. In this regard, a hierarchical structure may be dynamically generated as a layout is created and used to identify related components. By way of example, a hierarchical structure may begin with a parent A node. As the first new component is added to the layout, nodes B and C can become sibling nodes extending from parent A node. In this example, node C may be the new component, while node B is a manipulated version of the original node A (e.g., reduced in size and repositioned). The size of the components associated with nodes B and C may be 50% of the size of the component associated with parent A node. As a second new component is added for example in association with node B, nodes D and E can become sibling nodes extending from node B. In this example, node E may be the new component, while node D is a manipulated version of the original node B. The size of the components associated with nodes D and E may be 50% of the size of the component associated with node B. In the event a third new component is added as another component within node B, nodes D and E and new node F can be sibling nodes, with each a size of 33.3% of the size of the component associated with node B.

As sibling nodes are added, the area of the parent node is divided between the child sibling nodes. In some cases, the size of each sibling node may be the same, that is, the area of the parent node is divided equally between the child sibling nodes. In other cases, the size of each sibling node may be based on original proportions of the child nodes. By way of example only, assume that two child nodes exist, each occupying 50% of the area of the parent node. Now assume a user moves the boundary existing between the child nodes such that a first child node occupies 20% of the parent node area and a second child node occupies 80% of the parent node area. Further assume that a user now adds a component within the parent node component, such that three child nodes exist. The third new component can be created to occupy 33.33% of the parent node, while the remaining 66.66% is divided by the original, or previous, proportions of the first and second child node. In this example, the first child node previously occupying 20% of the parent node is modified to occupy approximately 13% (i.e., 20% of the remaining 66.66%), while the second child node previously occupying 80% of the parent node is modified to occupy approximately 53% (i.e., 80% of the remaining 66.66%).

In cases that a component stylization is to be applied, that is, an existing component is to be modified, another component(s) related to such a stylization can be identified. In embodiments, when a component border is selected or hovered over, typically, the component and/or one or more related components are modified to effectuate the modification to the layout design. For example, assume a border between two components is selected. In such a case, a surrounding component(s) is identified and manipulated in a manner consistent with the user input. For instance, if a border is moved to the left, the component on the left may be decreased in size, while the component on the right may be increased in size.

Manipulations to apply to the new or modified component and/or the related component(s) can be identified, for example, based on the detected input event. In this regard, in accordance with identifying one or more components to manipulate to accommodate a new component, a manipulation to apply to the related component(s) can be identified based on the user input. For instance, a position at which an input event is detected can indicate a manipulation to apply to a related component. By way of example only, assume that a single component exists on a layout. By hovering a new object over the left hand region of the existing component, the existing component can be identified as related. Based on user input provided in association with the left hand region, the existing component is reduced in size and moved to the right to accommodate the new component on the left hand side.

In embodiments, when a component region is selected or hovered over, typically, the new component is generated, and the related component corresponding with the region being selected or hovered over is modified to accommodate the new component. In some cases, an input event might be detected in association with a boundary between two existing components. In such a case, the components identified as related may include both the components surrounding or connected to the selected border. In this regard, when a user provides an indication to generate a new component between a first and a second component, the first and second component can be identified as related components to manipulate such that a new component is created therebetween. In some cases, the new component and the first and second components can be contained in an encompassing component. Any number of components may be identified as related components to manipulate.

In some cases, manipulations to apply may be determined using a minimal related component approach. To this end, the least amount of components that can be manipulated to effectuate a coordinated layout design may be identified and manipulated accordingly. For example, assume that an encompassing component contains three components. Further assume a user selects a border between two of the components to move. In such a case, the layout designer 230 may identify the two related components corresponding with the border and modify those two components while maintaining the third component. As such, if the border is moved to the left, the left component may be decreased in size and the center component may be increased in size, while the right component remains the same size.

As can be appreciated, in addition to manipulating the components based on detected input events, the layout designer 230 may be configured to modify the content and/or masks associated with objects within the components. Accordingly, as a component becomes larger or smaller, the object contained therein can be resized accordingly.

In accordance with embodiments described herein, the layout designer 230 can provide visual layout indicators and/or perform the layout manipulation. Visual layout indicators can provide an indication of how a component may be manipulated. By way of example only, assume that a new object is moved to hover over a top region of a component. In such a case, a preview may be provided that shows the component being reduced in size and moved to a below position to accommodate placement of the new object. Based on a user indication to effectuate the design modification (e.g., releasing a button to position the new object), the new object can be added in the appropriate location while the related component is resized and repositioned.

Further, the layout designer 230 may also be configured to provide snapping feedback. Snapping feedback refers to visual feedback indicating a location at which to snap or move a component or component border. As can be appreciated, snapping feedback can be provided to efficiently enable a user to align content as desired. Such snapping feedback may align with a center point, a component edge, or the like. Snapping feedback can be presented when adjusting component borders and/or when repositioning or moving components.

In accordance with one implementation, FIGS. 3A-3L provide exemplary user interfaces illustrating a coordinated dynamic layout design. FIGS. 3A-3L only provide examples of some implementations that may be employed, but are not intended to limit the scope of embodiments of the present invention. With initial reference to FIG. 3A, assume an initial component 302A is presented via a display. In this case, component 302A contains image B. Image B may be presented within component 302A, for example, as a default image or based on a prior drag and drop of image B into component 302A. Although image B is initially presented, as can be appreciated, the component 302A may be initially blank, that is, it does not contain any objects therein. A hierarchical structure created can include a parent node representing component 302A, which may be designated as "layout@100% horizontal," while a child node representing image B may be designated as "Image@100%." This hierarchical structure indicates that the child node, image B, is positioned to cover 100% of the underlying component 302A, which utilizes 100% of the layout.

Assume now that a user desires to place image A 304A into the layout having component 302A. In such a case, the user can select image A 304A and drag image A 304A to the layout region and over component 302A. The layout can be designed based on placement of image A 304A. For example, if the user positions image A 304A over the center of component 302A, image A 304A can occupy the entire component 302A, that is, replace content of image B with image A.

Figure 3A:
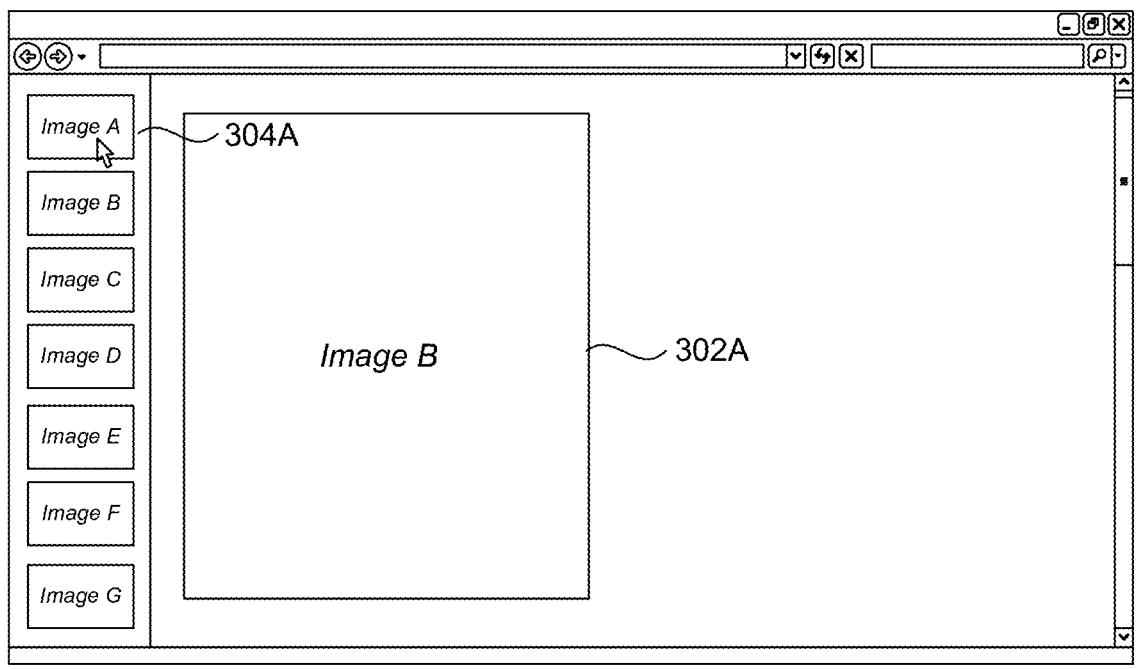
FIGS. 3A-3L illustrate exemplary user interfaces, in accordance with embodiments of the present invention.
Figure 3B:
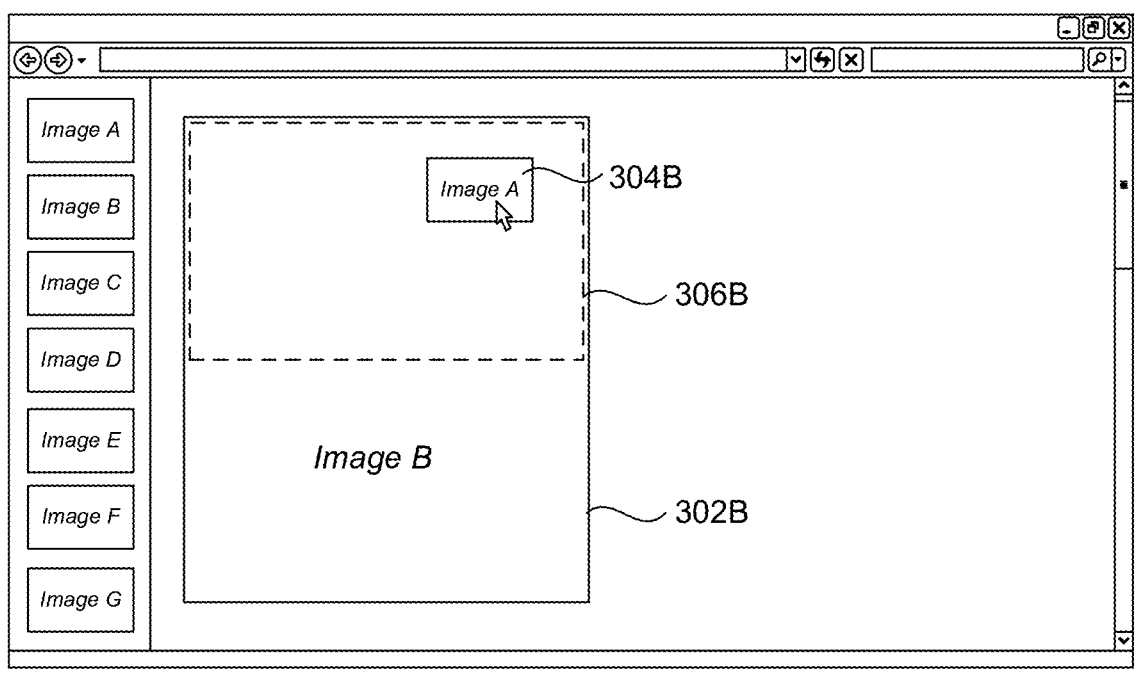

With reference to FIG. 3B, assume that the user wishes to place image A 304B on the top portion of the component 302B. In such a case, the user may position image A 304B over a top region of component 302B. Based on image A 304B hovering over a top region of the component 302B, a preview of the placement of the image is presented, as represented by the outline 306B. Such a placement indication may occur in any number of ways, such as outlining, highlighting, shading, coloring, etc.

Based on the user's desire to place image A 304B on the top portion of component 302B, the user may select such an action, for example, by releasing or dropping image A 304B.

Figure 3C:
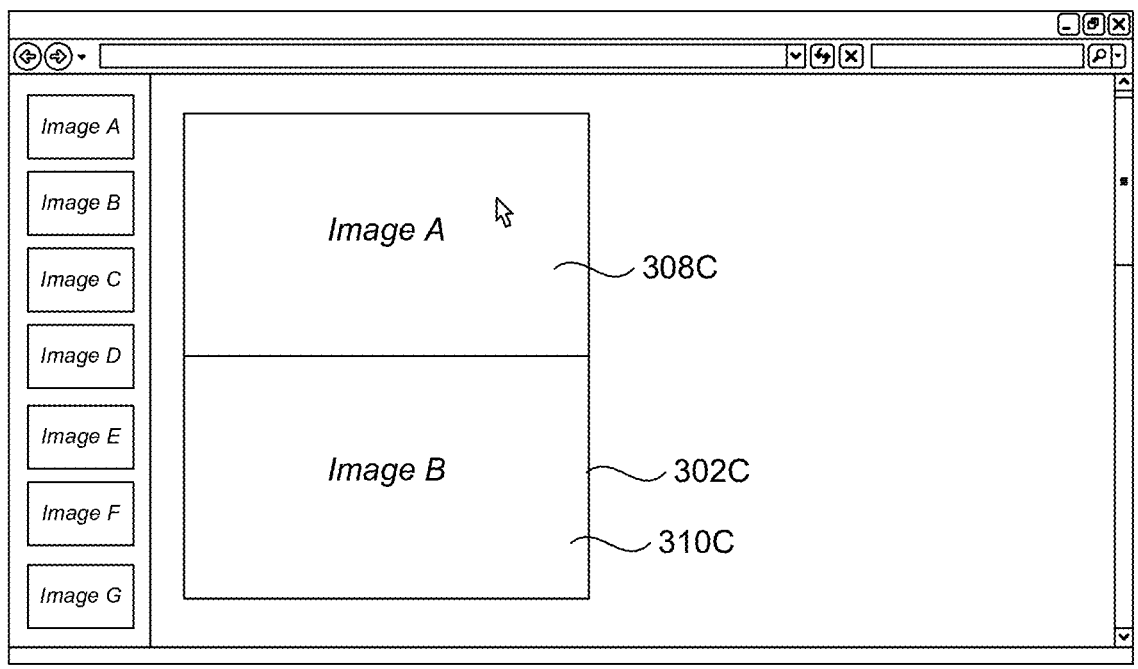

As shown in FIG. 3C, such an indication results in generation of component 308C being generated and image A being resized and placed therein. Further, component 302C is identified as a related component and is modified as component 310C to fit the bottom portion of the component 302C. Accordingly, in some embodiments, in a hierarchical structure, a parent node represents component 302C and children node 308C and 310C extend therefrom. By way of example, a hierarchical structure can include a parent node representing component 302C, which may be designated as "layout@100% vertical," while a child node representing image B may be designated as "Image@50%" and another child node representing image A may be designated as "Image@50%." This hierarchical structure indicates that the child nodes, image A and image B, are both positioned to cover 50% of the underlying component 302C, which utilizes 100% of the layout.

Figure 3D:
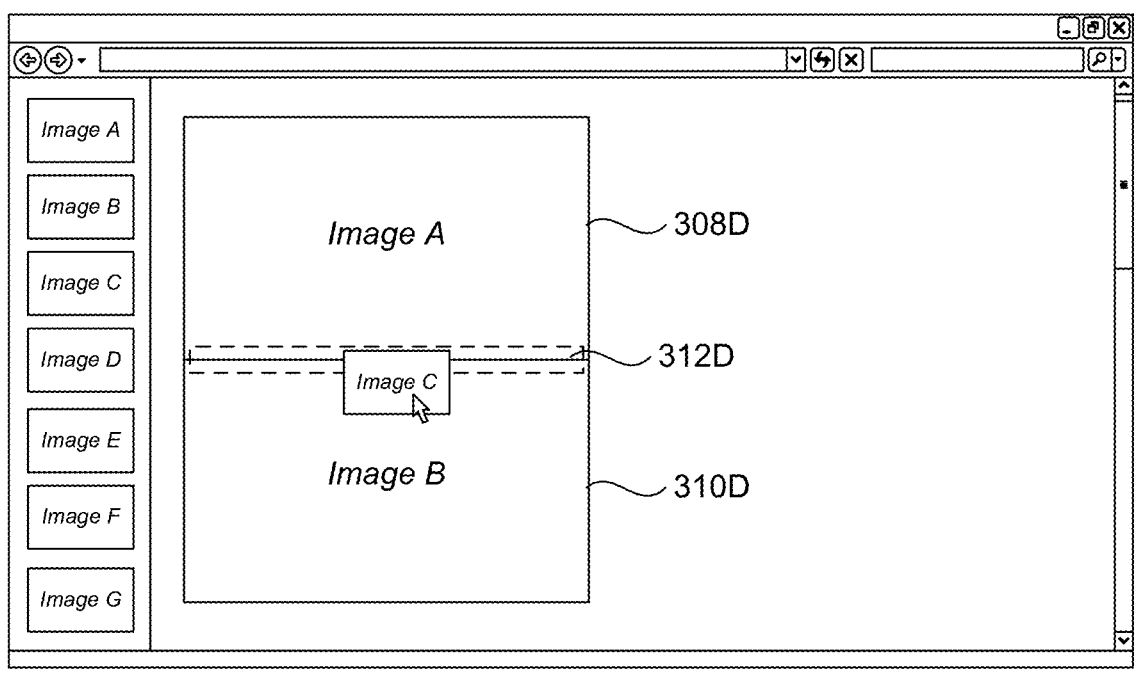

Now assume a user desires to place a new image C into the layout. In such a case, the user can drag the new image C over the layout and position the new image over a particular component region. By placing the new image over a component region, a new component can be generated in accordance therewith. With reference to FIG. 3D, the user may position image C near the border 312D between component 308D associated with image A and component 310D associated with image B. If placed in this position, a new component may be generated between components 308D and 310D. In this regard, component 308D and/or 310D can be modified to accommodate the new component. To this end, when a new component is positioned to align with the orientation of its parent component, the new component is placed within the seams as opposed to splitting the existing component. This can result in a hierarchical structure adding a child to the parent node and modifying the size (e.g., width) of the sibling nodes.

Figure 3E:
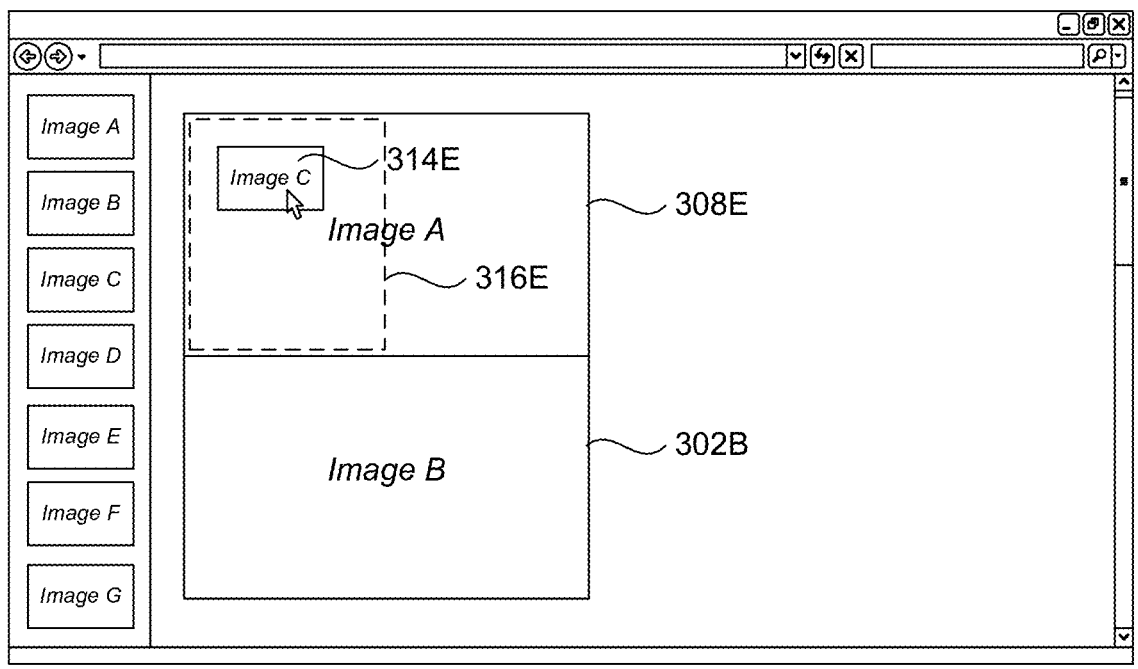
Figure 3F:
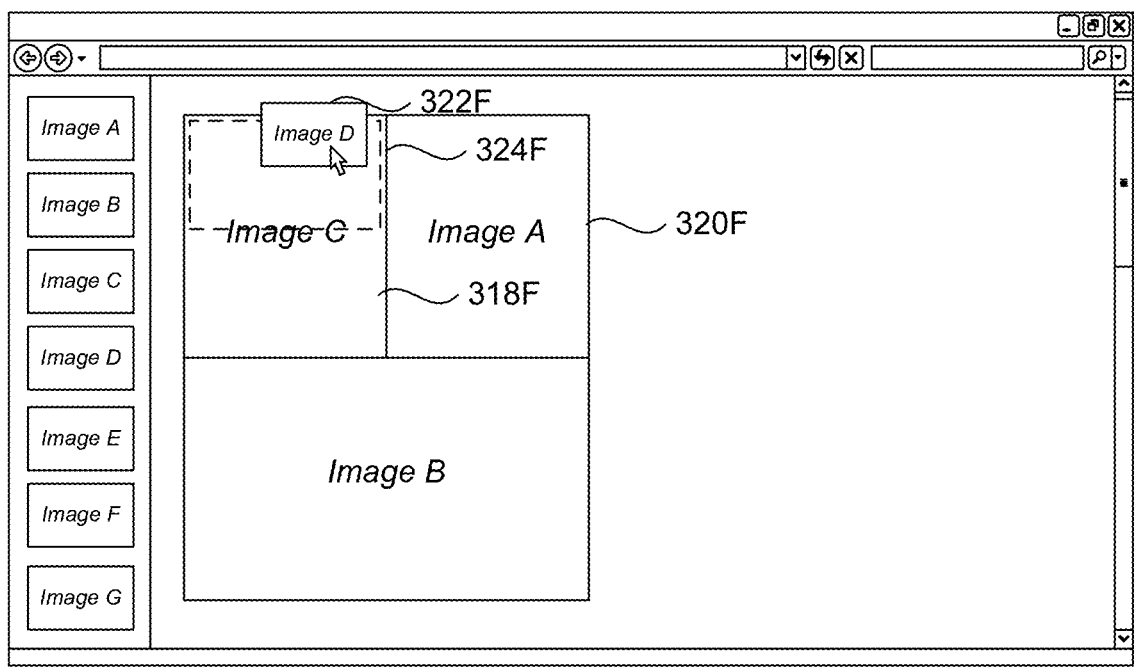

Assume, however, that the user wishes to place image C in the upper left hand corner of the canvas. In such a case, as shown in FIG. 3E, the user can move image C 314E over the left region of component 308E containing image A. Based on image C 314E hovering over a left region of the component 308E, a preview of the placement of the image C is presented, as represented by the outline 316E. Assume the user provides an indication to place image C in such a position. In such a case, as illustrated in FIG. 3F, such an indication results in generation of component 318F being generated and image C being sized and placed therein. Further, component 308E of FIG. 3E is identified as a related component and is modified as component 320F to accommodate the new component 318F. In embodiments, component 308E can be maintained and, as such, now contain component 318F and component 320F as nested components. Continuing with the hierarchical structure described above with reference to FIG. 3C, a hierarchical structure can include a parent node representing component 302F, which may be designated as "layout@100% vertical," while a first child node representing image B may be designated as "Image@50%" and a second child node representing prior component 308E may be designated as "Layout@50% horizontal." The second child node representing prior component 308E may now include two child nodes, one representing image C as "Image 50%" and one representing image A as "Image 50%. This hierarchical structure indicates that the child nodes, image C and image A, are both positioned to cover 50% of the underlying component 308E, which utilizes 50% of the layout. An exemplary hierarchical structure can be shown as:

Layout@ 100% vertical (representing component 302F)
Layout@50% horizontal (representing component 308E)
Image@50% (representing image C)
Image@50% (representing image A)
Layout@50% horizontal (representing image B)
Image@100% (representing image B)

Figure 3G:
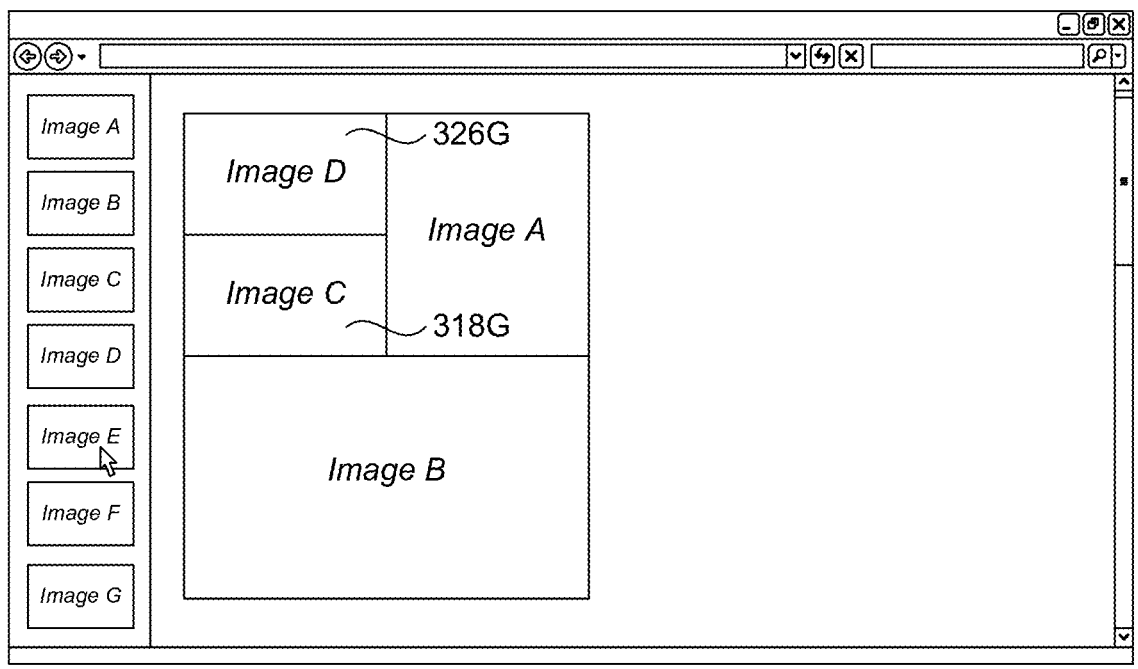

With continued reference to FIG. 3F, the user may position image D 322F over image C to preview placement 324F of a new component if created. Upon an indication to generate a new component in association with image D, as illustrated in FIG. 3G, new component 326G is created and placed in the layout, while component 318G is modified to accommodate new component 326G.

Figure 3H:
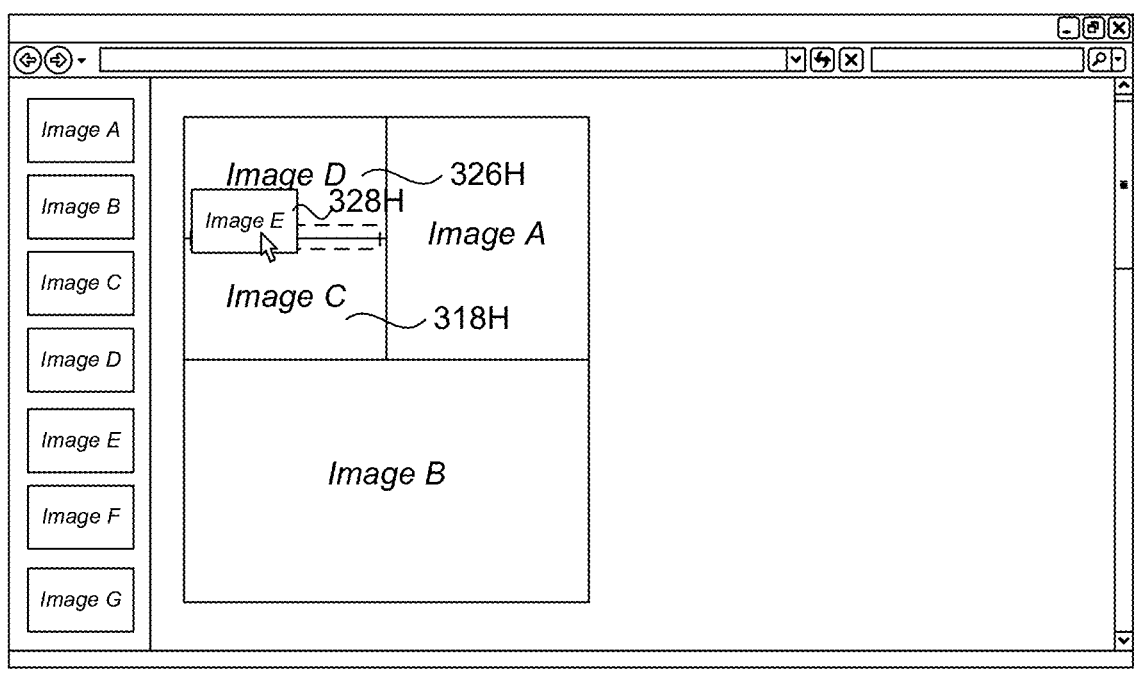
Figure 3I:
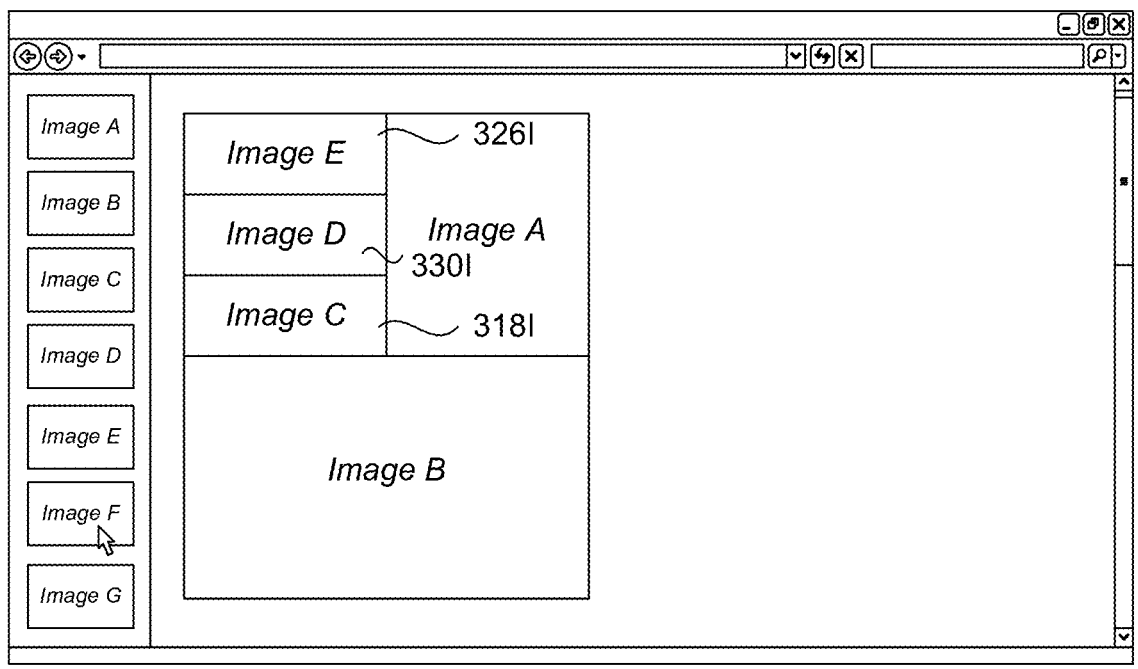

Now assume the user hovers image E 328H over a border between components 326H and 318H, as shown in FIG. 3H. Based on such positioning of image E, both component 326H and 318H are identified as related components to be modified to accommodate a new component associated with image E. As illustrated in FIG. 3I, component 326I and 318I are modified to accommodate new component 330I. Components 326I, 330I, and 318I may further be contained together in an encompassing component.

Figure 3J:
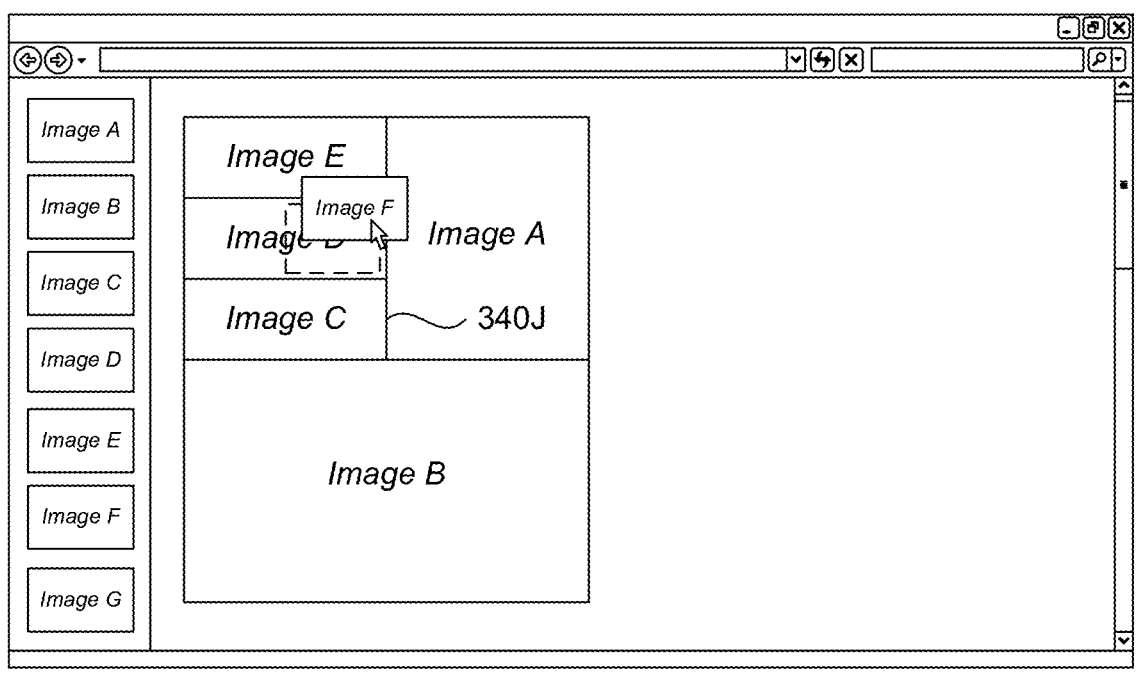
Figure 3K:
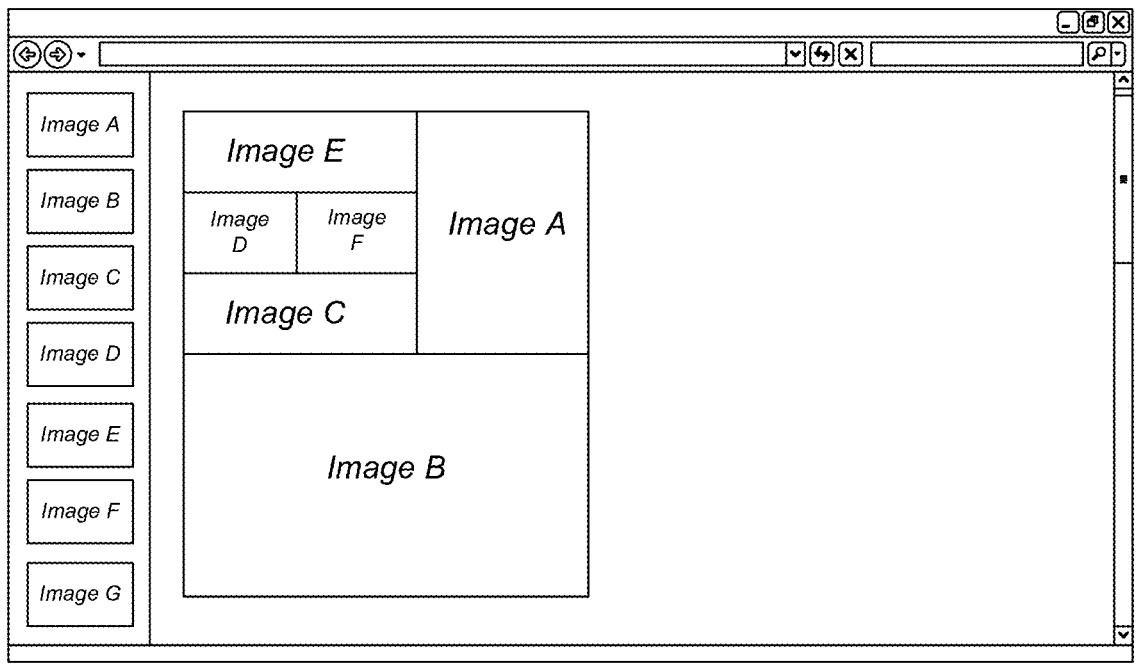
Figure 3L:
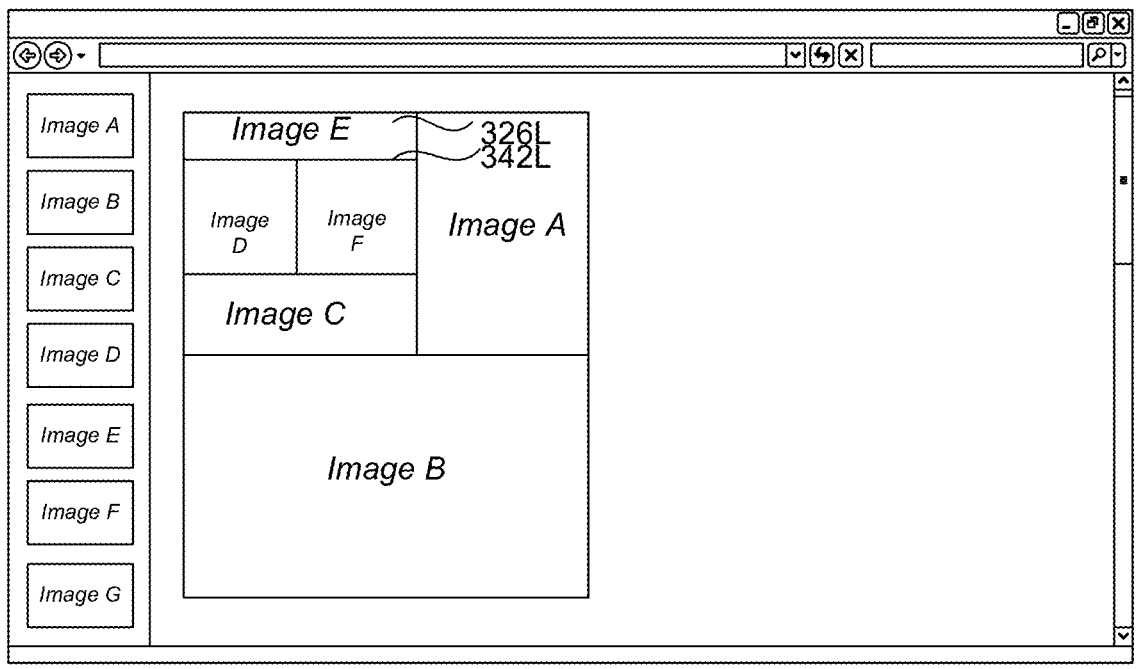

With reference to FIG. 3J, image F can be placed to generate a new component in relation to image D. Assume now that a user selects border 340J and moves the border 340J to the right to reduce the size of image A. As shown in FIG. 3K, image A is modified to a reduced size, while images C, D, E, and F are increased in size. Now, as shown in FIG. 3L, the user can reduce the height of component 326L by selecting and moving border 342L. In such a case, and in accordance with one embodiment of the present invention, components corresponding with images D and F may be identified as related and modified to accommodate the size change of component 326L. In other cases, however, components corresponding with images D, F, and C may be identified as related and each may be increased in size (e.g., proportionally increased) to accommodate the size change of component 326L.

Exemplary Flow Diagrams

Figure 4:
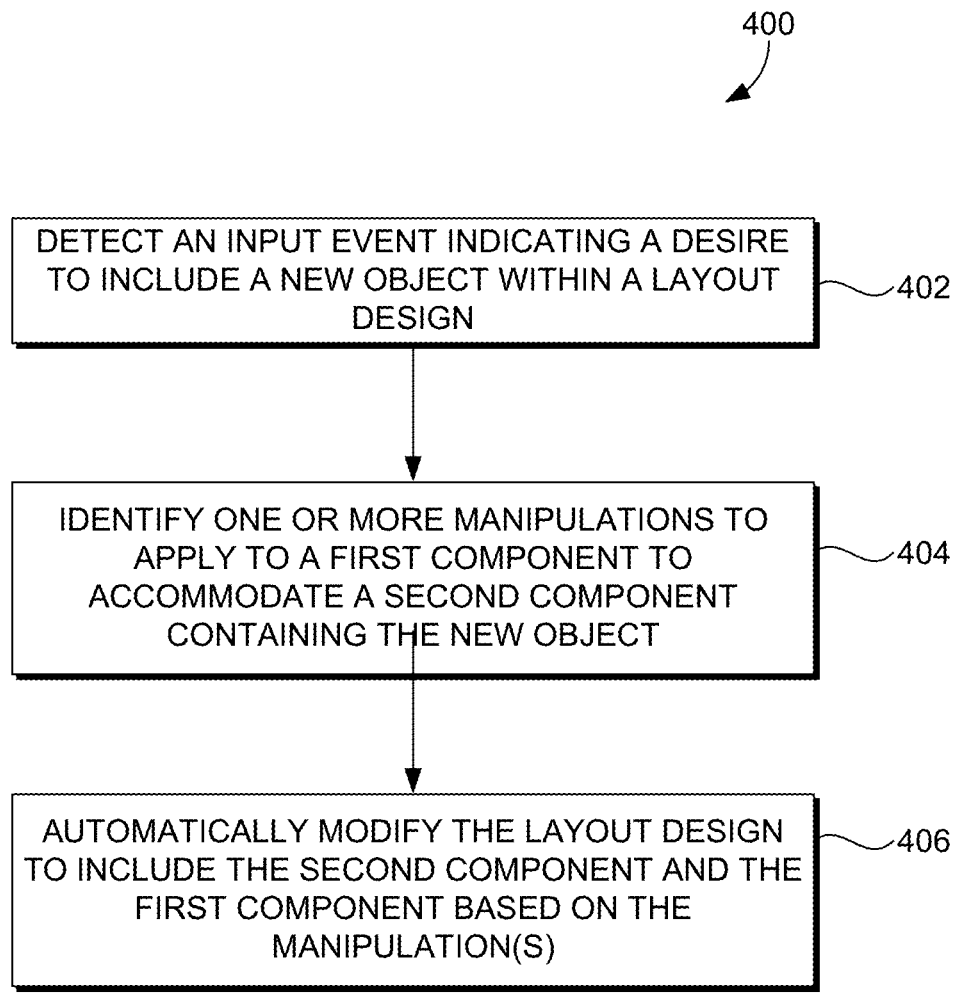
FIG. 4 is a flow diagram showing a method for facilitating layout designs, in accordance with various embodiments of the present invention.

Turning now to FIG. 4, a flow diagram is provided that illustrates a method 400 for facilitating dynamic layout design, in accordance with embodiments of the present invention. The method 400 may be carried out by a layout tool, such as layout tool 212 of FIG. 2. Initially, as shown at block 402, an input event that indicates a desire to include a new object within a layout design is detected. An input event can reflect a position and action associated with a user input. For example, an input event may be hovering an object over a component or component region. Based on the input event, at block 404, one or more manipulations to apply to a first component within the layout to accommodate a second component containing the new object within the layout are identified. In embodiments, such manipulations may include decreasing a size of a component, increasing a size of a component, repositioning a component, or the like. At block 406, the layout design is automatically modified to include the second component and the first component based on the manipulation determined to apply to the first component.

Figure 5:
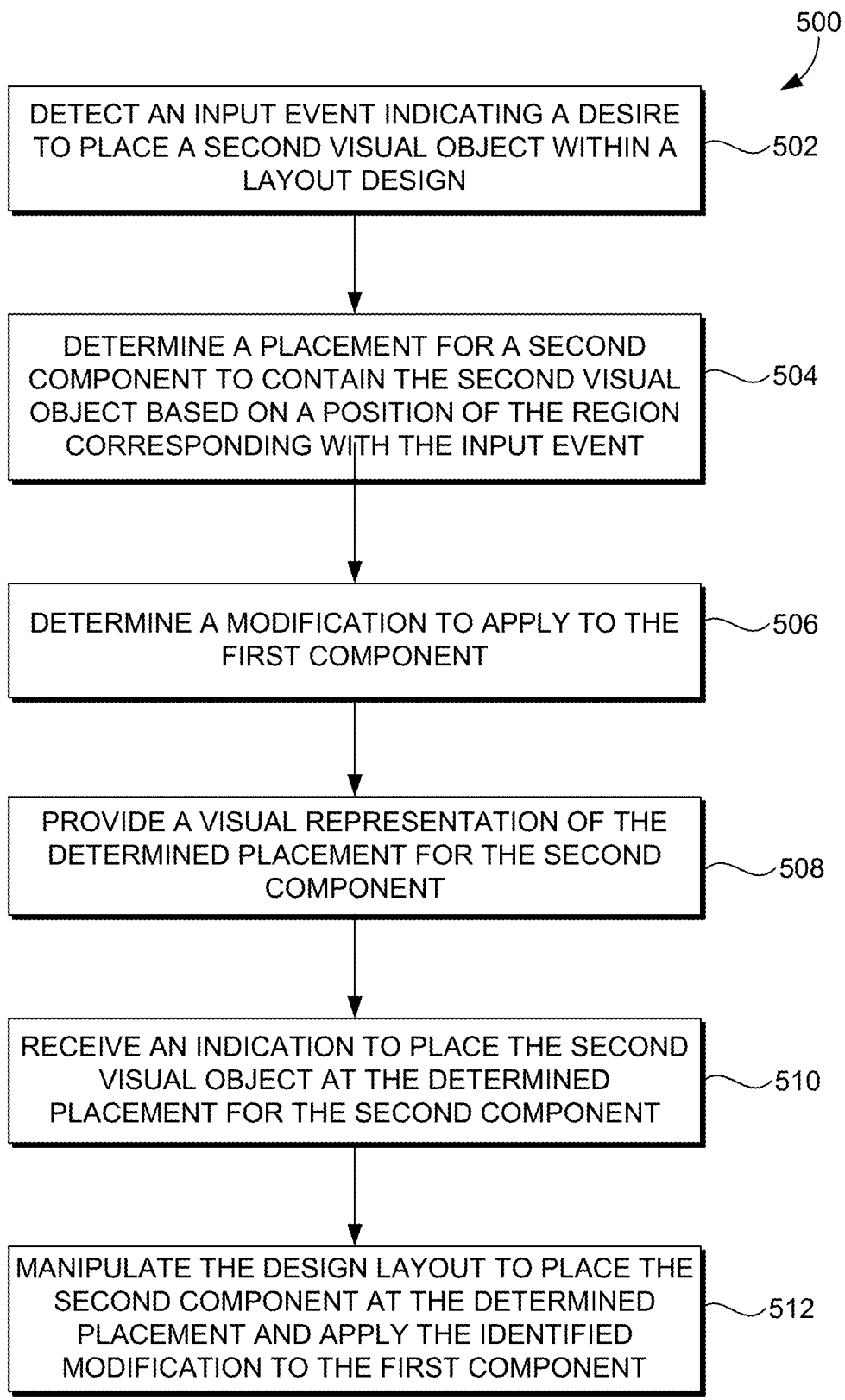
FIG. 5 is a flow diagram showing another method for facilitating layout designs, in accordance with various embodiments of the present invention.

Turning now to FIG. 5, a flow diagram is provided that illustrates a method 500 for facilitating dynamic layout design, according to embodiments provided herein. Initially, at block 502, an input event indicating a desire to place a second visual object within a layout design is detected. The input event may correspond with a region of a first component containing a first visual object. At block 504, based on a position of the region corresponding with the input event, determining a placement for a second component to contain the second visual object. By way of example, assume that a user hovers the second visual object over a top region of a first component. In such a case, a placement for the second component corresponds with the top portion of the first component. At block 506, a modification to apply to the first component is determined. Continuing with the example that a user hovers the second visual object over a top region of the first component, a modification to apply to the first component may be to reduce the size of the first component and reposition the first component downward to accommodate the second component above the first component. In this example, because the second visual object is hovered over the top region of the first component, the first component is repositioned down to accommodate the second component at the desired top region. In some cases, in addition to detecting the region of the first component being hovered over, a determination of whether the hovered over region aligns with the orientation of the first component can be made. For instance, when the hovered over region (e.g., bottom or top region) aligns with the orientation of the first component (e.g., a horizontal image), the first component may be manipulated (resized) to accommodate the second component without splitting the first component. That is, in a hierarchical structure, one child component can be added and the sibling component size is modified. On the other hand, when the hovered over region does not align (e.g., bottom or top region) with the orientation of the first component (e.g., vertical image), the first component may be split to create two child components.

The size to which to reduce the first component can be determined based on the fit of the first component and the second component within the encompassing component. By way of example, assume the encompassing component is the size of the original first component. To fit both the first and second components in the encompassing component, the height of the first component can be reduced in half to accommodate the second component on the top half. Typically, the components are rectangular in shape and are proportionally resized based on the encompassing component. In this regard, for example, an original parent component can be considered as a size of 100% of the layout. Upon adding a new component, two components can be created in equal proportions, such as a first component that is 50% of the original parent component (e.g., in height or width) and a second component that is 50% of the original parent component (e.g., in height of width). Now, if a third component is added to the original parent component, each of the first, second, and third components may be 33.3% of the original parent component (e.g., in height or width). On the other hand, if a third component is added to fit within the second component, the first component can maintain its 50% size of the original parent component, while second and third component have a size of 25% of the original parent component.

As described, any number of child components can continue to be added to an encompassing parent component. As child nodes are added as siblings, the area of the parent node is divided between the child sibling nodes to accommodate each of the child nodes. To determine the size of each child node, in some cases, the size of each sibling node may be the same, that is, the area of the parent node is divided equally between the child sibling nodes. For instance, when two child components exist, both may be 50% of the size of the parent node; when three child components exist, each may be 33.33% of the size of the parent node; when four child components exist, each may be 25% of the size of the parent node; and so forth.

In other cases, the size of child nodes may be based on original, or previous, size proportions of the child nodes. This implementation is particularly useful in cases that a user manually manipulates sizes of components, for example, by dragging a boundary of a component or between components. In this regard, as a new child node is added, the new child node may be a size of the parent divided by the number of child components (e.g., 100% divided by 4 equals 25%), while the remaining area (e.g., 75%) is proportional to the prior child component sizes. By way of example only, assume that two child nodes exist, each occupying 50% of the area of the parent node. Now assume a user moves the boundary existing between the child nodes such that a first child node occupies 20% of the parent node area and a second child node occupies 80% of the parent node area. Further assume that a user now adds a component within the parent node component, such that three child nodes exist. The third new component can be created to occupy 33.33% of the parent node, while the remaining 66.66% is divided by the original, or previous, proportions of the first and second child node. In this example, the first child node previously occupying 20% of the parent node is modified to occupy approximately 13% (i.e., 20% of the remaining 66.66%), while the second child node previously occupying 80% of the parent node is modified to occupy approximately 53% (i.e., 80% of the remaining 66.66%). Such an implementation accommodates a new child component while dividing the remaining area of the parent node to maintain original or prior proportions selected by a user.

In embodiments, an absolute pixel size of the original first component is recognized (e.g., 792 pt), while sizes of additional components can be referred to by way of percentages or proportions of the corresponding encompassing component. Such percentages or proportions can be used to identify a pixel size of corresponding components. By way of example only, assume an absolute pixel size of an original first component is 792 points (e.g., height dimension or width dimension of the layout). Also assume that the original first component encompasses two components, each having a size of 50% of the original first component. In such a case, each of the child components may be a size of 396 points (e.g., height dimension or width dimension).

In some implementations, a hierarchical structure representing a component layout hierarchy is accessed to facilitate identification of modifications to apply to accommodate the second component. For example, the hierarchical structure can be used to identify related components to adjust. In cases that one related component is identified to be modified, the related component might be modified by 50% in one or more dimensions to accommodate a new component. In cases that two related components are identified for modification, the related component might be modified by approximately 33% in one or more dimensions to accommodate a new component.

A visual representation of the determined placement for the second component is provided, as indicated at block 508. A visual representation may be provided in any number of formats, such as an outline, highlighting, etc. At block 510, an indication to place the second visual object at the determined placement for the second component is received. Thereafter, at block 510, the design layout is manipulated to place the second component at the determined placement and apply the identified modification to the first component.

As can be appreciated, new components can continue to be added or created within encompassing components. In some cases, a threshold size may limit the size to which the components may be reduced. In such cases, when the threshold size is reached, components may no longer be added within such an encompassing component.

Figure 6:
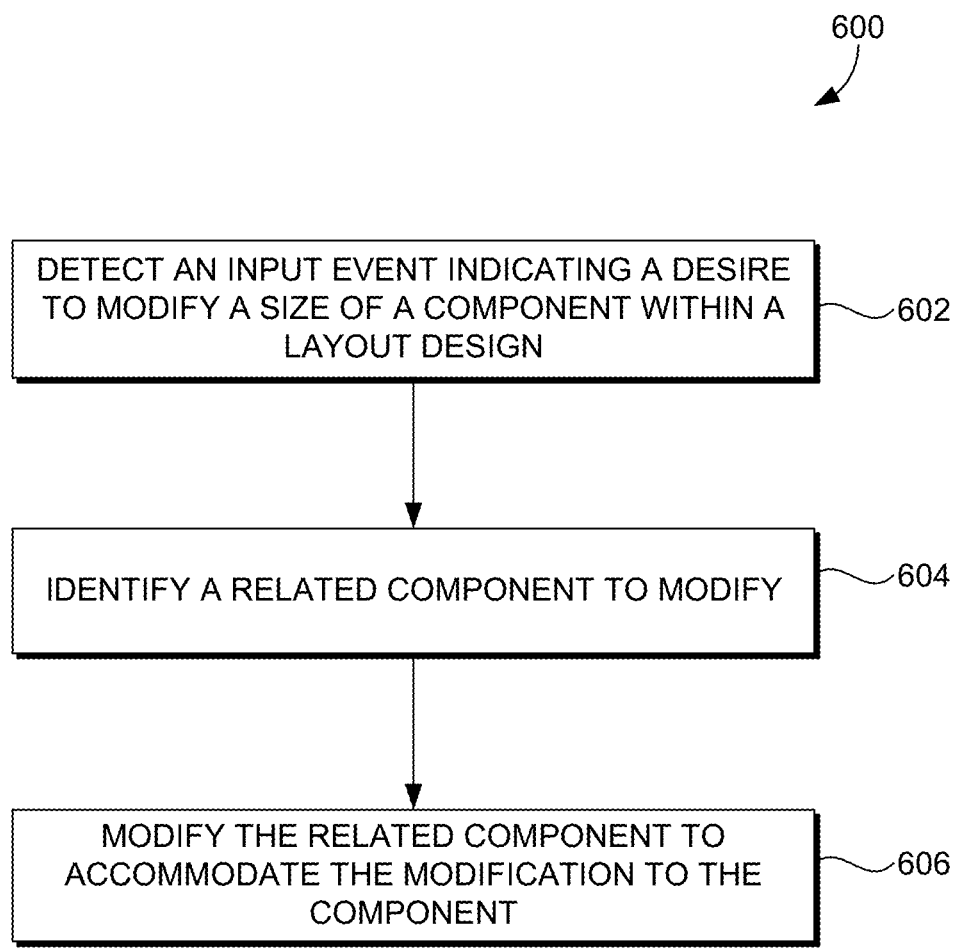
FIG. 6 is a flow diagram showing another method for facilitating layout designs, in accordance with various embodiments of the present invention.

With reference now to FIG. 6, a flow diagram is provided that illustrates another method 600 for facilitating dynamic layout design, according to embodiments provided herein. Initially, at block 602, an input event indicating a desire to modify a size of a component within a layout design is detected. For example, such an input event may include selection of a border of a component, etc. At block 604, a related component to modify is identified. A related component may share a border with the component being modified. As another example, a related component may be one or more components contained within a component encompassing the component being modified. At block 606, the related component is modified to accommodate the modification to the component. As can be appreciated, both the related component and the initial component to be modified can be manipulated in relation to one another.

Exemplary Computing Environment

Figure 7:
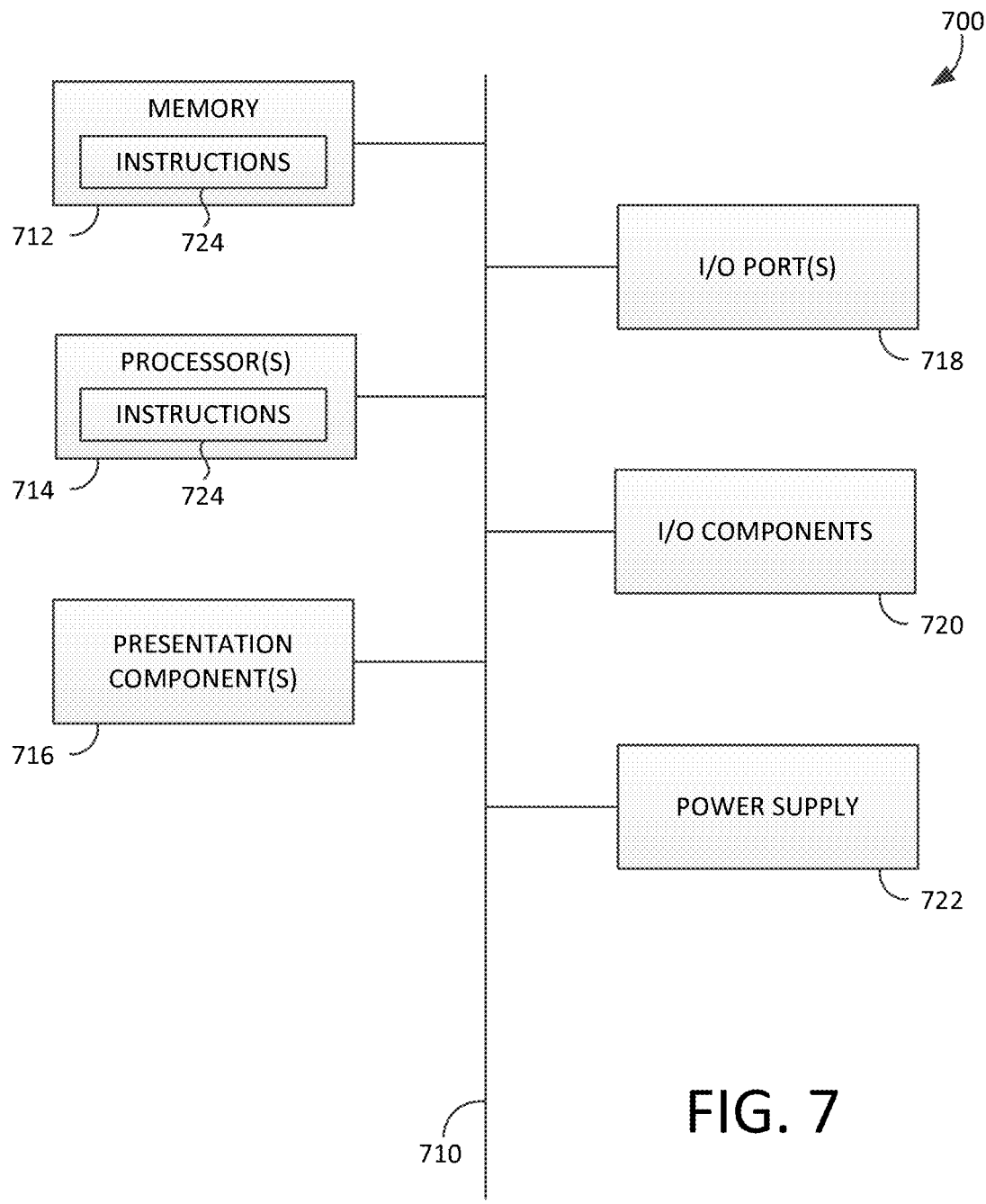
FIG. 7 is a block diagram of an exemplary computing environment suitable for use in implementing embodiments of the present invention.

Having described embodiments of the present invention, an exemplary operating environment in which embodiments of the present invention may be implemented is described below in order to provide a general context for various aspects of the present invention. Referring now to FIG. 7 in particular, an exemplary operating environment for implementing embodiments of the present invention is shown and designated generally as computing device 700. Computing device 700 is but one example of a suitable computing environment and is not intended to suggest any limitation as to the scope of use or functionality of the invention. Neither should the computing device 700 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 7, computing device 700 includes a bus 710 that directly or indirectly couples the following devices: memory 712, one or more processors 714, one or more presentation components 716, input/output (I/O) ports 718, input/output components 720, and an illustrative power supply 722. Bus 710 represents what may be one or more busses (such as an address bus, data bus, or combination thereof). Although the various blocks of FIG. 7 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventor recognizes that such is the nature of the art, and reiterates that the diagram of FIG. 7 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 7 and reference to "computing device."

Computing device 700 typically includes a variety of computer-readable media. Computer-readable media can be any available media that can be accessed by computing device 700 and includes both volatile and nonvolatile media, and removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 700. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 712 includes computer-storage media in the form of volatile and/or nonvolatile memory. The memory may be removable, non-removable, or a combination thereof. Exemplary hardware devices include solid-state memory, hard drives, optical-disc drives, etc. Computing device 700 includes one or more processors that read data from various entities such as memory 712 or I/O components 720. Presentation component(s) 716 present data indications to a user or other device. Exemplary presentation components include a display device, speaker, printing component, vibrating component, etc.

I/O ports 718 allow computing device 700 to be logically coupled to other devices including I/O components 720, some of which may be built in. Illustrative components include a microphone, joystick, game pad, satellite dish, scanner, printer, wireless device, etc. The I/O components 720 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 700. The computing device 700 may be equipped with depth cameras, such as stereoscopic camera systems, infrared camera systems, RGB camera systems, touchscreen technology, and combinations of these, for gesture detection and recognition. Additionally, the computing device 700 may be equipped with accelerometers or gyroscopes that enable detection of motion. The output of the accelerometers or gyroscopes may be provided to the display of the computing device 700 to render immersive augmented reality or virtual reality.

As can be understood, embodiments of the present invention provide for, among other things, facilitating layout designs. The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. One or more computer storage media storing computer-useable instructions that, when used by one or more computing devices, cause the one or more computing devices to perform operations comprising:
   detecting an input event indicating a desire to include a new object within a layout design including a first component;
   accessing a hierarchical structure that identifies relationships between the first component and a plurality of components within the layout design, the hierarchical structure indicating percentages associated with the first component and each of the plurality of components based at least in part on the identified relationships;
   based on the detected input event and the hierarchical structure, determining a manipulation to apply to the first component within the layout design to accommodate a newly created second component to be generated to contain the new object within the layout design, wherein the first component is determined to occupy a first percentage of an area of an encompassing component and the newly created second component is determined to occupy a second percentage of the area of the encompassing component, the first percentage being proportional to the second percentage, the manipulation to apply to the first component comprising a repositioning and a resizing in association with the first component; and
   modifying the layout design to include the newly created second component and the first component based on the manipulation determined to apply to the first component.

2. The one or more computer storage media of claim 1, wherein the input event comprises an action and a position of a user interaction.

3. The one or more computer storage media of claim 1, wherein the input event comprises a hovering of the new object over the first component.

4. The one or more computer storage media of claim 1, wherein the new object comprises an image, text, or a combination thereof.

5. The one or more computer storage media of claim 1, wherein the manipulation to apply to the first component is a reduction in size of the first component.

6. The one or more computer storage media of claim 1, wherein the manipulation to apply to the first component is based on an input event position.

7. The one or more computer storage media of claim 6, further comprising associating the input event position with the manipulation to apply to the first component.

8. The one or more computer storage media of claim 1, further comprising providing a preview of a position for the newly created second component.

9. The one or more computer storage media of claim 1, wherein the first component and the newly created second component are nested within the encompassing component.

10. The one or more computer storage media of claim 1, wherein the first component includes a nested component.

11. A computerized method to facilitate layout design, the method comprising:
    detecting, via a computing device, an input event indicating a desire to place a second visual object within a layout design, the input event corresponding with a region of a first component containing a first visual object within the layout design;
    accessing a hierarchical structure that identifies relationships between the first component and a plurality of components within the layout design;
    based on a position of the region corresponding with the input event and the hierarchical structure, determining a placement for a newly created second component to contain the second visual object and a modification to apply to the first component, wherein the first component is determined to occupy a first percentage of an area of an encompassing component and the newly created component is determined to occupy a second percentage of the area of the encompassing component, the first percentage being proportional to the second percentage;
    providing a visual representation of the determined placement for the newly created second component, wherein the determined placement for the newly created second component occupies at least the region of the first component; and
    upon receiving an indication to place the second visual object at the determined placement for the newly created second component, manipulating the layout design to place the newly created second component at the determined placement and applying the identified modification to the first component, wherein the manipulation to the layout design generates a new relationship in the hierarchical structure between the first component and the newly created second component.

12. The method of claim 11, further comprising manipulating the content of the first visual object.

13. The method of claim 11, wherein the first component includes a nested component.

14. The method of claim 11 further comprising:
    detecting a second input event indicating a desire to place a third visual object within the layout design, the second input event corresponding with a region of the newly created second component containing the second visual object; and
    manipulating the layout design to modify the newly created second component to accommodate a newly created third component containing the third visual object, wherein the first component is maintained.

15. The method of claim 11, wherein the visual representation comprises a border indicating the determined placement.

16. The method of claim 11, wherein the modification to apply to the first component comprises a reduction in size of the first component.

17. A computer system comprising:
an input detecting means configured to detect an input event indicating a desire to include a new object within a layout design including a first component; and
a layout design means configured to:
access a hierarchical structure that identifies relationships between the first component and a plurality of components within the layout design the hierarchical structure indicating percentages associated with the first component and each of the plurality of components based at least in part on the identified relationships;
based on the hierarchical structure, determine a manipulation to apply to the first component within the layout design to accommodate a newly created second component containing the new object within the layout design, wherein the first component is determined to occupy a first percentage of an area of an encompassing component and the newly created component is determined to occupy a second percentage of the area of the encompassing component, the first percentage being equal to the second percentage; and
modify the layout design to include the newly created second component and the first component based on the manipulation determined to apply to the first component, wherein the modification creates a relationship in the hierarchical structure between the first component and the newly created second component such that the manipulated first component and the newly created second component are child nodes of the encompassing parent component that occupies a space of the first component prior to the modification of the layout design.

18. The system of claim 17, wherein the input event comprises an action and a position of a user interaction.

19. The system of claim 17, wherein the input event comprises a hovering of the new object over the first component.

20. The system of claim 17, wherein the new object comprises an image, text, or a combination thereof.

* * * * *